United States Patent
Gudipati

(10) Patent No.: US 9,208,310 B2
(45) Date of Patent: Dec. 8, 2015

(54) SYSTEM AND METHOD FOR SECURELY MANAGING ENTERPRISE RELATED APPLICATIONS AND DATA ON PORTABLE COMMUNICATION DEVICES

(71) Applicant: Cognizant Technology Solutions India Pvt. Ltd, Tamil Nadu (IN)

(72) Inventor: Ambaprasad Gudipati, Hyderabad (IN)

(73) Assignee: COGNIZANT TECHNOLOGY SOLUTIONS INDIA PVT. LTD. (IN)

( * ) Notice: Subject to any disclaimer, the term of this patent is extended or adjusted under 35 U.S.C. 154(b) by 205 days.

(21) Appl. No.: 14/017,528

(22) Filed: Sep. 4, 2013

(65) Prior Publication Data
US 2015/0007350 A1    Jan. 1, 2015

(30) Foreign Application Priority Data
Jun. 26, 2013 (IN) ............................ 2794/CHE/2013

(51) Int. Cl.
*G06F 21/55* (2013.01)
*G06F 21/54* (2013.01)
*G06F 7/04* (2006.01)

(52) U.S. Cl.
CPC .............. *G06F 21/552* (2013.01); *G06F 21/54* (2013.01); *G06F 2221/2149* (2013.01)

(58) Field of Classification Search
CPC ......... G06F 21/50; G06F 21/51; G06F 21/52; G06F 21/53; G06F 21/60; G06F 21/604; G06F 2221/2149; G06F 21/62
See application file for complete search history.

(56) References Cited

U.S. PATENT DOCUMENTS

| | | | |
|---|---|---|---|
| 7,239,877 B2 | 7/2007 | Corneille et al. | |
| 8,001,610 B1 * | 8/2011 | Chickering et al. | ............ 726/27 |
| 8,347,380 B1 * | 1/2013 | Satish et al. | ..................... 726/22 |
| 8,392,712 B1 | 3/2013 | Wilson | |
| 2006/0070030 A1 * | 3/2006 | Laborczfalvi | ............. G06F 9/52 717/120 |
| 2006/0236127 A1 * | 10/2006 | Kurien et al. | ................. 713/193 |
| 2007/0006321 A1 * | 1/2007 | Bantz et al. | ..................... 726/27 |
| 2008/0168528 A1 * | 7/2008 | Lin | ......................... G06F 21/53 726/1 |
| 2008/0222707 A1 * | 9/2008 | Pathuri et al. | ...................... 726/4 |
| 2008/0250406 A1 * | 10/2008 | Carpenter et al. | ................ 718/1 |
| 2009/0049510 A1 * | 2/2009 | Zhang et al. | ....................... 726/1 |
| 2009/0217385 A1 * | 8/2009 | Teow et al. | ..................... 726/27 |
| 2009/0235358 A1 * | 9/2009 | Tolba | .............................. 726/24 |
| 2010/0125911 A1 * | 5/2010 | Bhaskaran | ...................... 726/23 |

(Continued)

FOREIGN PATENT DOCUMENTS

WO    2013022849    2/2013

OTHER PUBLICATIONS

U.S. Appl. No. 61/790409, filed Mar. 15, 2013.*

*Primary Examiner* — Darren B Schwartz
(74) *Attorney, Agent, or Firm* — Cantor Colburn LLP

(57) ABSTRACT

A system and computer-implemented method for securely managing enterprise related applications and associated data on one or more portable communication devices is provided. The system comprises one or more appboxes, residing on the one or more portable communication devices, configured to secure, monitor and collect information related to at least one of: one or more applications and associated data and the one or more portable communication devices. The system further comprises a server configured to facilitate one or more administrators to monitor and manage overall functionality of at least one of: the one or more applications and associated data and the one or more portable communication devices using the collected information.

33 Claims, 6 Drawing Sheets

(56) References Cited

U.S. PATENT DOCUMENTS

| | | | |
|---|---|---|---|
| 2010/0192196 A1* | 7/2010 | Lee | 726/1 |
| 2010/0235830 A1* | 9/2010 | Shukla et al. | 718/1 |
| 2011/0113467 A1* | 5/2011 | Agarwal et al. | 726/1 |
| 2011/0131572 A1* | 6/2011 | Elyashev ............ G06F 9/45533 | 718/1 |
| 2011/0145833 A1* | 6/2011 | De Los Reyes et al. | 718/106 |
| 2011/0209008 A1* | 8/2011 | Arapov | 714/48 |
| 2011/0219433 A1* | 9/2011 | Albrecht-Buehler ............ G06F 9/45533 | 726/4 |
| 2011/0314534 A1* | 12/2011 | James | 726/9 |
| 2012/0054744 A1* | 3/2012 | Singh et al. | 718/1 |
| 2012/0066760 A1* | 3/2012 | Anderson ............ G06F 21/6218 | 726/17 |
| 2012/0204235 A1* | 8/2012 | Jaudon et al. | 726/4 |
| 2012/0311659 A1 | 12/2012 | Narain et al. | |
| 2013/0007848 A1 | 1/2013 | Chaskar et al. | |
| 2013/0086479 A1* | 4/2013 | Brown ............... G06F 21/6218 | 715/741 |
| 2013/0145463 A1* | 6/2013 | Ghosh et al. | 726/22 |
| 2013/0254831 A1* | 9/2013 | Roach et al. | 726/1 |
| 2014/0237537 A1* | 8/2014 | Manmohan et al. | 726/1 |
| 2014/0280913 A1* | 9/2014 | Karren et al. | 709/224 |
| 2015/0089673 A1* | 3/2015 | Beckman ............ H04L 63/105 | 726/29 |

\* cited by examiner

SYSTEM AND METHOD FOR SECURELY MANAGING ENTERPRISE RELATED APPLICATIONS AND DATA ON PORTABLE COMMUNICATION DEVICES

FIELD OF THE INVENTION

The present invention relates generally to enterprise mobility management. More particularly, the present invention provides a system and method for securely managing enterprise related applications and associated data on portable communication devices.

BACKGROUND OF THE INVENTION

Employees of numerous organizations access enterprise related data and applications via desktops and various portable communication devices such as laptops, palmtops, mobile phones and Personal Digital Assistants (PDAs). Enterprise mobility management focusses on providing the enterprise related data and applications to employees via portable communication devices. Further, providing enterprise related data and applications on the portable communication devices enable businesses and enterprises in doing business efficiently.

Usually, businesses or enterprises provide Company Owned Devices (CODs) to the employees for connectivity and accessing enterprise related data and applications. Although, providing CODs is a secure mechanism for the enterprises however device acquisition and maintenance expenses result in increased costs for the enterprise. Moreover, employees do not prefer to use separate devices for business and personal purposes. Recently, enterprises have started adopting Bring Your Own Device (BYOD) approach. The BYOD approach ensures improved connectivity and accessibility to enterprise related data and applications. However, securing the enterprise related data and applications in a BYOD environment is often difficult and poses a lot of challenges during device management, application management, application performance and health monitoring, diagnostics and disaster recovery.

Various systems and methods exist for managing portable communication devices in BYOD environment. For example, Mobile Device Management (MDM) solutions exist that facilitate managing health of the portable communication devices, business applications and content, controlling downloadable applications, remotely deleting content of the device and maintaining inventory of the number and types of portable communication devices. Another way of managing portable communication devices in BYOD environment includes using Mobile Application Management (MAM) solutions that facilitate provisioning and controlling access to various business applications on portable communication devices. However, privacy and freedom of the users are curtailed as MDM solutions monitor the portable communication devices and MAM solutions monitor the applications without interruption.

To overcome the abovementioned disadvantages, the enterprises use mobile virtualization. For example, the enterprise can opt for type 1 mobile virtualization wherein the hypervisor runs directly on top of the hardware of the portable communication device for facilitating virtualization. However, type 1 virtualization has limited acceptance from equipment vendors and operating system vendors. Another way of mobile virtualization is type 2 virtualization that allows running multiple operating systems simultaneously on single platform. However, type 2 virtualization results in slowing the guest operating systems. Moreover, the operating systems need to be upgraded whenever there is an upgrade of hardware or firmware.

In light of the above, there is a need for a system and method for securely providing and managing enterprise related data and applications on portable communication devices. Further, there is a need for a system and method that is independent of the users' portable communication devices and operating system. Furthermore, there is a need for a system and method that does not monitor the users' portable communication devices and applications when used for personal purposes thereby providing privacy and freedom. In addition, there is a need for a system and method that does not result in slowing the portable communication device while providing enterprise related data. Also, there is a need for a system and method that facilitates one or more administrators to remotely configure and manage enterprise related applications on the users' portable communication devices.

SUMMARY OF THE INVENTION

A system and computer-implemented method for securely managing enterprise related applications and associated data on one or more portable communication devices is provided. The system comprises one or more appboxes, residing on the one or more portable communication devices, configured to secure, monitor and collect information related to at least one of: one or more applications and associated data and the one or more portable communication devices. The system further comprises a server configured to facilitate one or more administrators to monitor and manage overall functionality of at least one of: the one or more applications and associated data and the one or more portable communication devices using the collected information.

In an embodiment of the present invention, the one or more appboxes comprise an AppGuard configured to secure the one or more applications and associated data. The AppGuard is further configured to receive authentication details from one or more users via the one or more portable communication devices. Furthermore, the AppGuard is configured to perform a check to ascertain if the received authentication details are valid. In addition, the AppGuard is configured to perform a check to ascertain if the one or more users are accessing the one or more appboxes within permissible geographical limit and time frame. Also, the AppGuard is configured to allow the one or more users to access the one or more appboxes and the one or more applications and associated data if it is ascertained that the received authentication details are valid and the one or more users are accessing the one or more appboxes within permissible geographical limit and time frame. In an embodiment of the present invention, securing the one or more applications and associated data comprises at least one of: encrypting the data associated with the one or more applications, preventing sharing of documents via one or more communication channels, preventing capturing of data as a screenshot, preventing unauthorized access to databases, preventing file download, maintaining file download limit, managing one or more network connections, preventing copying and pasting of objects, creating secure service calls, capturing and storing runtime events information, auditing logs, detecting threats and attacks on the one or more applications and facilitating deploying one or more counter measures.

In an embodiment of the present invention, the one or more portable communication devices are monitored and information related to the one or portable communication devices is collected when the one or more appboxes are accessed by one or more users. In an embodiment of the present invention, monitoring and managing the overall functionality of at least one of: the one or more applications and associated data and the one or more portable communication devices by the one or more administrators comprise: monitoring applications usage, user engagement, response time, transactions and resource usage, upgrading the one or more applications, deploying counter measures, locking and unlocking the one or more appboxes, deleting the one or more applications, deleting the data associated with the one or more applications, checking statuses of the one or more portable communication devices, accessing application logs and viewing any other information related to the one or more applications and the one or more portable communication devices.

In an embodiment of the present invention, the server further comprises an admin module configured to facilitate the one or more administrators to configure the one or more appboxes on the one or more portable communication devices. The admin module is further configured to install one or more applications on the one or more configured appboxes. Furthermore, the admin module is configure to control and manage the configured one or more appboxes and the one or more installed applications wherein configuring the one or more appboxes and installing the one or more applications is based on profiles of the one or more users. In an embodiment of the present invention, the one or more applications include at least one of: one or more applications installed by the one or more administrators and one or more optional applications which are downloaded by the one or more users. In an embodiment of the present invention, the one or more appboxes are designed to securely host the one or more applications and associated data and further wherein the hosted one or more applications run on operating systems of the one or more portable communication devices. In an embodiment of the present invention, the one or more portable communication devices include at least one of: a notebook, a laptop, a mobile phone, a smart phone and a Personal Digital Assistant (PDA).

In an embodiment of the present invention, the one or more appboxes comprise an AppHealth module configured to manage health of the one or more applications by tracing one or more problems and providing one or more remedial measures and further wherein tracing problems and providing one or more remedial measures comprise performing at least one of: diagnosis, debugging and backing up local data in case of crashing of the one or more applications. In an embodiment of the present invention, the collected information related to the one or more applications and associated data include at least one of: application usage, application responsiveness, battery usage and user engagement with the one or more applications. In an embodiment of the present invention, the collected information related to the one or more portable communication devices include at least one of: device identifier, device type, operating system version, device connectivity and device location.

The computer-implemented method for securely managing enterprise related applications and associated data on one or more portable communication devices, via program instructions stored in a memory and executed by a processor, comprises allowing one or more users to access one or more appboxes and one or more applications and associated data, wherein the one or more appboxes reside on the one or more portable communication devices. The computer-implemented method further comprises securing, monitoring and collecting information related to at least one of: the one or more applications and associated data and the one or more portable communication devices. Furthermore, the computer-implemented method comprises sending the collected information to a server on a real time basis. In addition, the computer-implemented method comprises facilitating the one or more administrators to manage and monitor overall functionality of at least one of: the one or more applications and associated data and the one or more portable communication devices using the information received by the server.

In an embodiment of the present invention, the step of allowing the one or more users to access the one or more Appboxes and the one or more applications comprise receiving authentication details from the one or more users via the one or more portable communication devices. The step of allowing the one or more users to access the one or more Appboxes and the one or more applications residing on the one or more appboxes further comprise performing a check to ascertain if the received authentication details are valid, performing a check to ascertain if the one or more users are accessing the one or more appboxes within permissible geographical limit and time frame and allowing the one or more users to access the one or more appboxes and the one or more applications if it is ascertained that the received authentication details are valid and the one or more users are accessing the one or more appboxes within permissible geographical limit and time frame.

In an embodiment of the present invention, the computer-implemented method further comprises facilitating the one or more administrators to configure the one or more appboxes on the one or more portable communication devices. Furthermore, the computer-implemented method comprises facilitating the one or more administrators to install the one or more applications on the one or more appboxes. In addition, the computer-implemented method comprise facilitating the one or more administrators to control and manage the one or more configured appboxes and the one or more installed applications, wherein the step of configuring the one or more appboxes and installing the one or more applications is based on profiles of the one or more users.

In an embodiment of the present invention, the computer-implemented method further comprises the step of managing the health of the one or more applications, wherein managing the health of the one or more applications comprise tracing one or more problems and providing one or more remedial measures and further wherein tracing the one or more problems and providing the one or more remedial measures comprise performing at least one of: diagnosis, debugging and backing up local data in case of crashing of the one or more applications.

A computer program product for securely managing enterprise related applications and associated data on one or more portable communication devices is provided. The computer program product comprises a non-transitory computer-readable medium having computer-readable program code stored thereon, the computer-readable program code comprising instructions that when executed by a processor, cause the processor to: allow one or more users to access one or more appboxes and one or more applications and associated data, wherein the one or more appboxes reside on the one or more portable communication devices. The processor further secures, monitors and collects information related to at least one of: the one or more applications and associated data and the one or more portable communication devices. Furthermore, the processor sends the collected information to a server on a real time basis. Also, the processor facilitates the one or more administrators to manage and monitor overall functionality of at least one of: the one or more applications and associated data and the one or more portable communication devices using the information received by the server.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for securely managing enterprise related applications and associated data on portable communication devices is described herein. The invention provides for a system and method that is independent of user's portable communication device and operating system. The invention further provides for a system and method that does not monitor the user's portable communication device and applications when used for personal purposes thereby providing privacy and freedom. Furthermore, the invention provides for a system and method that does not result in slowing the user's portable communication device while providing enterprise related data. The invention also provides for a system and method that facilitates one or more administrators to remotely configure and manage the enterprise related applications on the users' portable communication devices.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
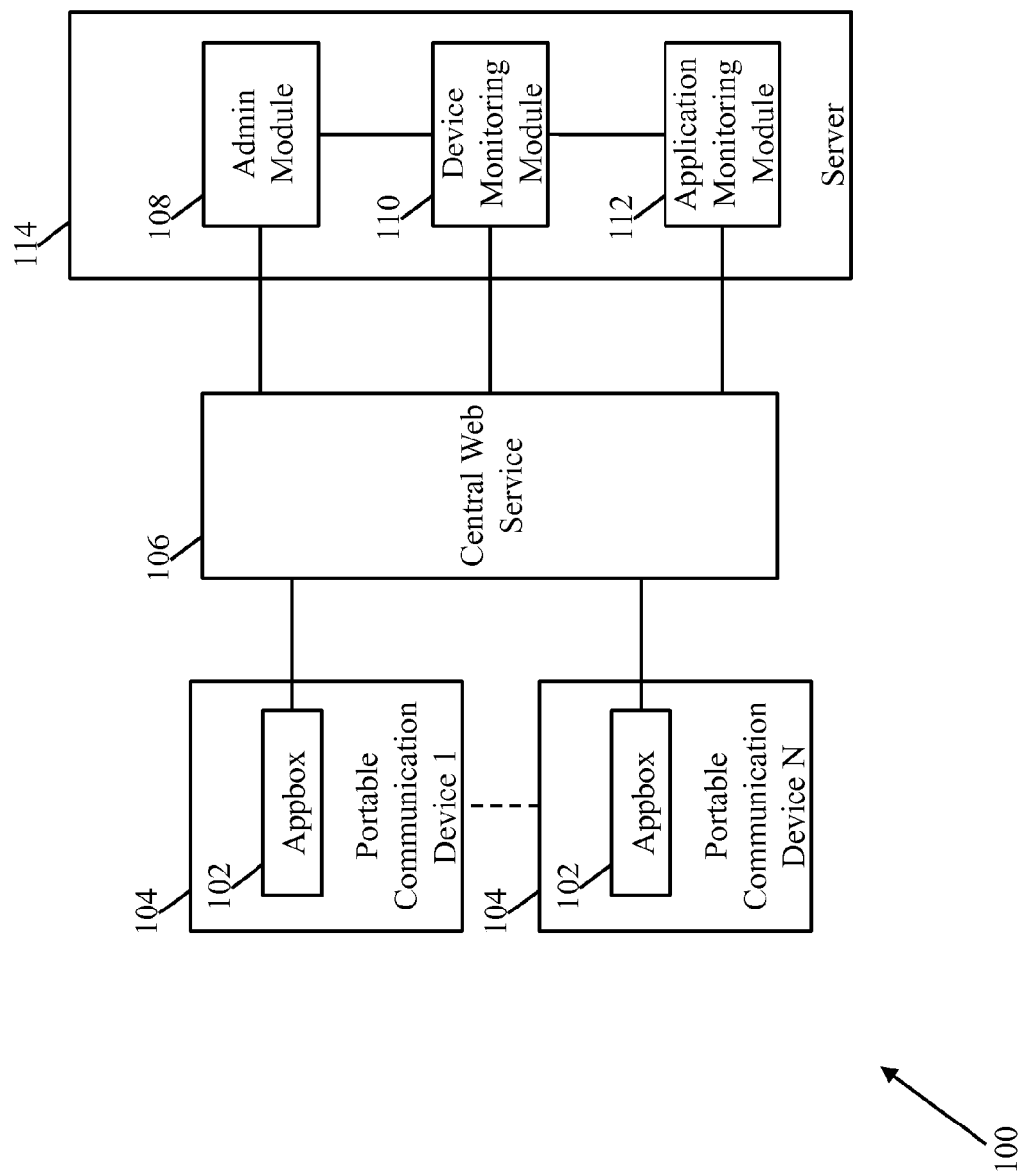
FIG. 1 is a block diagram illustrating a system for securely managing enterprise related applications and associated data on one or more portable communication devices, in accordance with an embodiment of the present invention.

FIG. 1 is a block diagram illustrating a system for for securely managing enterprise related applications and associated data on portable communication devices, in accordance with an embodiment of the present invention. The system 100 comprises an appbox 102 residing inside one or more portable communication devices 104, an admin module 108, a device monitoring module 110 and an application monitoring module 112.

The appbox 102 is a software application designed to securely host one or more applications and associated data on the one or more portable communication devices 104. Further, the one or more applications include, but not limited to, one or more pre-installed applications and one or more optional applications. In an embodiment of the present invention, the one or more applications hosted on the appbox 102 run directly on operating systems of the one or more portable communication devices 104. In an embodiment of the present invention, the appbox 102 can be downloaded and installed on any portable communication device 104 independent of the operating system of the portable communication device 104. In various embodiments of the present invention, the one or more portable communication devices 104 include, but not limited to, a notebook, a laptop, a mobile phone, a smart phone and a Personal Digital Assistant (PDA).

In an embodiment of the present invention, application stores are distribution platforms for various applications including the appbox 102. In an embodiment of the present invention, the appbox 102 is downloaded from a public application store. In another embodiment of the present invention, the appbox 102 is downloaded from an enterprise application store.

In an embodiment of the present invention, the appbox 102 allows the one or more users to access the one or more pre-installed applications and associated data on the appbox 102. The one or more pre-installed applications are mandatory applications that are downloaded and installed on the appbox 102 by an administrator at the time of installing the appbox 102 on the one or more portable communication devices. In an embodiment of the present invention, the administrator downloads and installs the one or more applications based on identity and role of the one or more users/employees in an enterprise or an organization. The administrator also provides authentication details to facilitate the one or more users to access the appbox 102.

In an embodiment of the present invention, the appbox 102 also allows the one or more users to download and access the one or more optional applications and associated data on the appbox 102. The one or more optional applications are pre-approved applications that the one or more users may or may not download on the appbox 102. In an embodiment of the present invention, the administrator may configure a list of optional applications that the one or more users may download on the appbox 102 as per choices and preferences. In an embodiment of the present invention, the appbox 102 protects and monitors performance of all the applications hosted on the appbox 102. In an embodiment of the present invention, the appbox 102 can access data stores corresponding to the hosted applications which are being accessed by the one or more users. The appbox 102 will be explained in detail in later sections of the specification.

In an embodiment of the present invention, each of one or more appboxes 102 residing in the one or more portable communication devices 104 communicate on a real time basis with a server 114 via a central web service 106. The server 114 comprises the admin module 108, the device monitoring module 110, the application monitoring module 112 and a repository (not shown). The central web service 106 is a software system designed to support inter-operable machine-to-machine interaction over World Wide Web (WWW or W3).

The admin module 108 is configured to facilitate one or more administrators to control, manage and configure each of the one or more appboxes 102 residing in one or more portable communication devices 104. Further, the admin module 108 comprises a user interface to facilitate the one or more administrators to perform various activities such as, but not limited to, remotely installing new applications to the one or more appboxes 102, configuring new policies, attaching policies to applications, remotely install applications for the one or more users having a particular profile, creating new profiles, adding applications to profiles, mapping profiles to a specific role and configuring the appbox 102 based on the profile of the one or more users.

In an embodiment of the present invention, the one or more administrators, via the admin module 108, configure appbox 102 on a user's portable communication device 104 and provide authentication details to facilitate the user to access the appbox 102. Further, each of the one or more appboxes 102 is associated with a profile stored in the repository (not shown) of the server 114. Furthermore, the profile of the user is created by the one or more administrators based on the user's identity and role in the organization. Each of the one or more profiles have its corresponding pre-installed applications, optional applications, limitations associated with data download, data protection and file sharing, accessibility options, security checks and protection measures. In an embodiment of the present invention, the one or more administrators, via the admin module 108, associate the one or more applications to the one or more profiles. In an embodiment of the present invention, the one or more applications associated with a particular profile are then automatically installed on the appbox 104, when the appbox 104 is pushed/configured on the one or more portable communication devices 104 of the user having particular profile.

In an embodiment of the present invention, the one or more administrators remotely install new applications to the one or more appboxes 104 via the admin module 108 based on the profiles of the one or more users. In an embodiment of the present invention, the one or more administrators access the admin module 108 to configure new policies of the organization thereby controlling and managing the one or more appboxes and the one or more applications. Further, the new policies may result in modifying the configuration of the existing profiles stored in the repository (not shown) of the server 114 by adding new applications, deleting applications, modifying accessibility rights, modifying download limit and any other modifications based on the new policies.

In an embodiment of the present invention, the one or more administrators configure and update one or more counter measures for the one or more applications on the appbox 102 via the admin module 108. Further, the one or more counter measures facilitate in protecting the one or more applications on the appbox 102. Furthermore, the one or more counter measures are updated via the central web service 106 on the one or more appboxes 102. In an embodiment of the present invention, the one or more counter measures include, but not limited to, activating flags that facilitate network security, database protection and data protection.

The device monitoring module 110 is configured to communicate with the one or more appboxes 102 to facilitate one or more administrators to monitor the one or more appboxes 102 and the one or more portable communication devices 104. In an embodiment of the present invention, the one or more administrators include, but not limited to, application creators, application developers, members of security and operations team of the organization and any other support users.

In an embodiment of the present invention, the device monitoring module 110 collects information related to the one or more portable communication devices 104 when the appbox 102 is accessed by the one or more users. Further, monitoring is enabled only when the appbox 102 is accessed for corporate usage and not when the portable communication device 104 is accessed for personal usage.

In operation, when the one or more users are accessing the one or more appboxes 102 installed on the one or more portable communication devices 104, the device monitoring module 110 monitors and receives information such as, but not limited to, device usage, device identifier, device type, operating system version, device connectivity, device location, resource usage and diagnostics from the one or more appboxes 102. Further, the collected information is presented to the one or more administrators to facilitate checking statuses of the one or more portable communication devices 104 and detecting one or more security threats. If the one or more administrators detect the one or more security threats, one or more counter measures corresponding to the one or more security threats are implemented. In an embodiment of the present invention, the device monitoring module 110 also facilitates the one or more administrators to lock and unlock the appbox 102, wipe the applications hosted on the appbox 102, delete data related to applications hosted on the appbox 102, monitor user engagement with the appbox 102, monitor number of users accessing the appboxes 102, access application logs, monitor exceptions and crashes and view any other relevant information related to the one or more portable communication devices 104 using the received information.

The application monitoring module 112 is configured to communicate with the one or more appboxes 102 to facilitate the one or more administrators to monitor and manage overall functionality of the one or more applications and associated data and the one or more appboxes 102. The application monitoring module 112 provides an interface to the one or more administrators to monitor the applications' usage and user engagement with the various applications, upgrade the one or more applications, monitor application response time, monitor transactions, monitor resource usage, deploy the one or more counter measures in case of crashes and security threats and view any other information related to the one or more applications hosted on the one or more appboxes 102.

In operation, the application monitoring module 112 monitors various parameters such as, but not limited to, launch time, screen response time, battery usage and network usage related to each of the one or more applications on the appbox 102. The one or more administrators then configure Key Performance Indicators (KPIs), Lower Control Limits (LCLs) and Upper Control Limits (UCLs) of the monitored parameters for future monitoring. In an embodiment of the present invention, the application monitoring module 112 also collects detailed application diagnostic information to facilitate the one or more administrators to check errors and exceptions. Also, the diagnostic information facilitates the one or more administrators to create application patches and application upgrades. In an embodiment of the present invention, the application monitoring module 112 comprises one or more application probes (not shown) that facilitate in remotely shutting the appbox 102 in case any of the one or more applications cause security threats. Further, shutting the appbox 102 prevents launching other applications thereby protecting the enterprise related applications and data.

Figure 2:
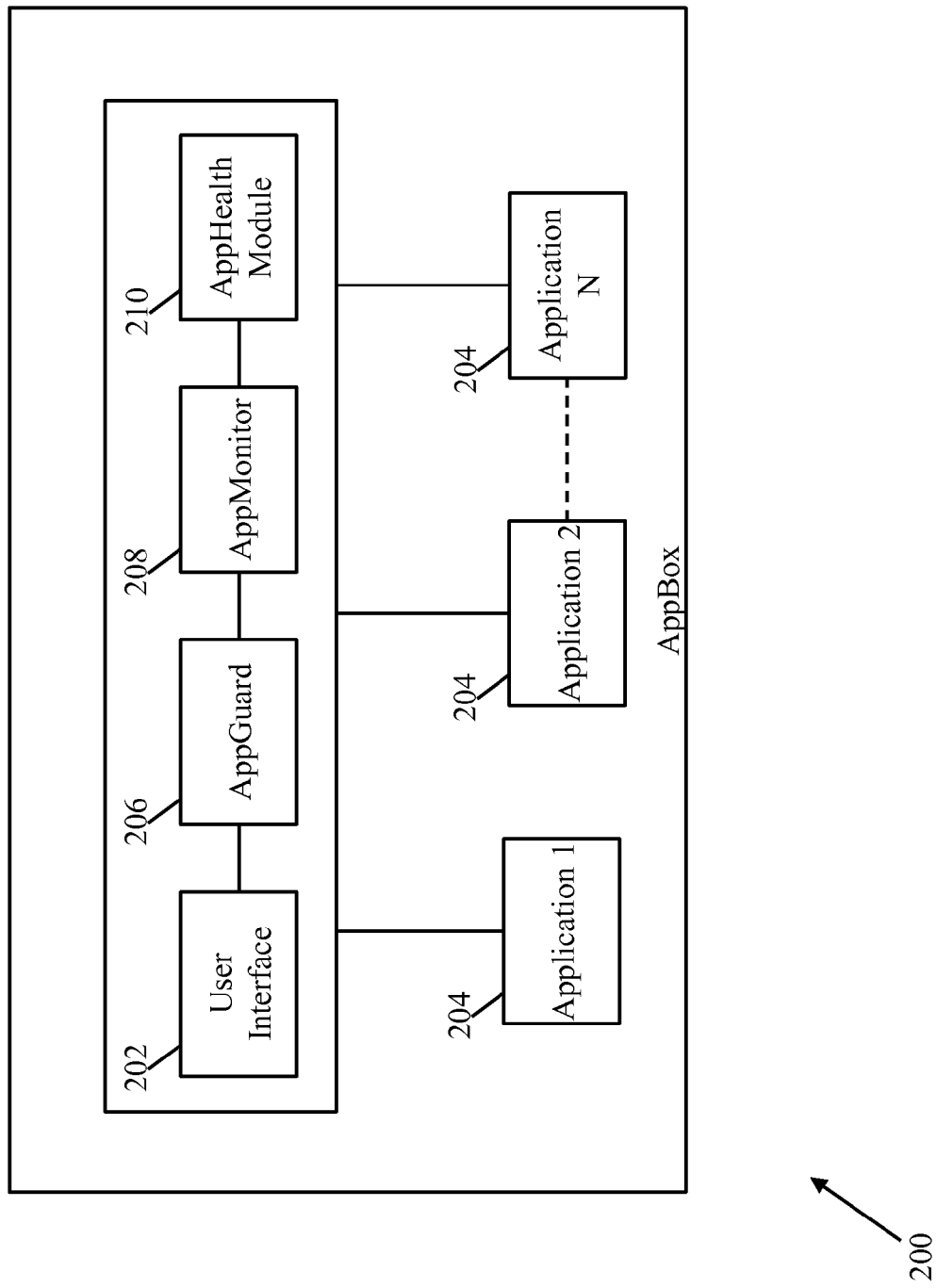
FIG. 2 is a detailed block diagram illustrating an appbox for securely managing enterprise related applications and associated data on one or more portable communication devices, in accordance with an embodiment of the present invention.

FIG. 2 is a detailed block diagram illustrating an appbox for securely managing enterprise related applications and associated data on portable communication devices, in accordance with an embodiment of the present invention. The appbox 200 comprises a user interface 202, one or more applications 204, an AppMonitor 206, an AppGuard 208 and an AppHealth module 210.

The user interface 202 is a front-end interface configured to facilitate a user to access the appbox 200. Further, the user interface 202 comprises a user console (not shown) to facilitate the one or more users to manage the one or more applications on the appbox 200. In an embodiment of the present invention, the user provides authentication details via the user interface 202 to access the various applications on the appbox 200. In another embodiment of the present invention, the user accesses the pre-installed applications associated with the user profile via the user interface 202. In yet another embodiment of the present invention, the user downloads and installs the one or more optional applications associated with the user profile via the user console (not shown). In yet another embodiment of the present invention, the user accesses the details of associated profile via the user interface 202.

The one or more applications 204 are software applications installed on the appbox 200. The one or more applications 204 are associated with the profile of the user using the portable communication device 104 (FIG. 1) on which the appbox 200 is installed. In an embodiment of the present invention, the one or more applications include, but not limited to, the one or more pre-installed applications and the one or more optional applications. In an embodiment of the present invention, the one or more pre-installed applications include mandatory applications associated to the user's profile such as, but not limited to, electronic mailing application, time-sheet application, billing application and any other applications that the user needs, based on their role and profile, to work for the organization. The one or more optional applications include, but not limited, charity application, social application, messenger, birthday application and any other application that the user has an option to download and install.

The AppGuard 206 is configured to secure the one or more applications 204 and associated data on the appbox 200. The AppGuard 206 facilitates mechanisms to reduce run-time vulnerability of the one or more applications 204. Further, the AppGuard 206 collects application logs, prevents exploitation, detects vulnerability attacks, deploys the one or more counter measures to improve response time and reduce impact of the vulnerability attacks on the one or more applications 204. In an embodiment of the present invention, if the AppGuard 206 detects that the one or more applications 204 are vulnerable and prone to threats and attacks, the AppGuard 206 facilitates implementing the one or more counter measures. Further, the one or more counter measures include, but not limited to, activating flags that facilitate network security, database protection, data encryption and data protection. The one or more counter measures are implemented by the one or more users via the device monitoring module 110 (FIG. 1) and the application monitoring module 112 (FIG. 1).

In an exemplary embodiment of the present invention, the Appguard 206 collects information related to network usage by any specific application running on an appbox 200. Further, the Appguard 206 compares the collected information with historic network usage and current network usage of the specific application on other appboxes 200. The Appguard 206 then detects security threats in case there is high network usage by the specific application and facilitates the one or more administrators to deploy the one or more counter measures. In another exemplary embodiment of the present invention, the Appguard 206 facilitates the one or more administrators to configure the application usage timings, usage duration and usage location via the application monitoring module 112 (FIG. 1). Further, in case of abnormal usage of the one or more applications, the one or more administrators detect the security threats and lock the appbox 200 or wipe all critical applications hosted on the appbox 200.

In an embodiment of the present invention, the AppGuard 206 also sends regular updates related to, but not limited to, security of the one or more applications 204 and the collected information to the device monitoring module 110 (FIG. 1) and the application monitoring module 112 (FIG. 1) via the central web service 106 (FIG. 1). The AppGuard 206 is discussed in detail in later sections of the specification.

The AppMonitor 208 is configured to monitor and collect information related to the one or more applications 204 and associated data and the one or more portable communication devices 104 (FIG. 1). The AppMonitor 208 collects information related to the one or more applications such as, but not limited to, application usage, application responsiveness, battery usage, user engagement and any other information related to application monitoring. In an embodiment of the present invention, the user engagement information includes, but not limited, feature usage of an application, duration of usage of an application, most used application, usage timings and peak usage hours. The user engagement information facilitates the AppMonitor 208 in identifying popular applications and popular features of the applications, setting Key Performance Indicators (KPIs), measuring KPIs and modifying KPIs.

In an embodiment of the present invention, the AppMonitor 208 comprises a performance monitoring Application which facilitates in monitoring the one or more applications on the appbox 102 (FIG. 1) and the one or more portable communication devices 104 (FIG. 1). In an embodiment of the present invention, the performance monitoring application facilitates in capturing and providing details such as, but not limited to, application name, application id and application version.

In an embodiment of the present invention, the performance monitoring application calls an application monitoring application to provide information related to the one or more applications to the application monitoring module 112 (FIG. 1). In another embodiment of the present invention, the performance monitoring application calls a device monitoring application to provide information related to the portable communication device 104 (FIG. 1) to the device monitoring module 110 (FIG. 1).

In an embodiment of the present invention, the performance monitoring application calls a location monitoring application to capture the location of the portable communication device 104 (FIG. 1). In another embodiment of the present invention, the performance monitoring application calls a connection monitoring application to get information related to the device connectivity. Further, information related to the device connectivity includes, but not limited to, connection status and connectivity mode such as Global System for Mobile (GSM), Wi-Fi and Code Division Multiple Access (CDMA). In an embodiment of the present invention, the AppMonitor 208 sends the collected device information to the device monitoring module 110 (FIG. 1) via the central web service 106 (FIG. 1). Further, the collected device information includes, but not limited, device identifier, device type, operating system version, device connectivity and device location.

In an embodiment of the present invention, the AppMonitor 208 comprises a usage application which facilitates in providing information related to usage time of the one or more applications 204. Further, the AppMonitor 208 sends the information related to the usage time to the application monitoring module 112 (FIG. 1). The AppMonitor 208 also sends information related to the features of the one or more applications 204 such as, but not limited to, feature name, feature id, duration of usage and status to the application monitoring module 112 (FIG. 1).

In an embodiment of the present invention, the performance monitoring application calls a memory monitoring application to capture memory usage information such as, but not limited to, used memory, free memory and memory usage per application. The performance monitoring application also calls a central Processing Unit (CPU) monitoring application to capture CPU information such as, but not limited to, percentage of CPU utilization on current time stamp. In addition, the performance monitoring application calls a disk monitoring application to capture information related to disk usage of each of the one or more applications 204. The performance monitoring application also calls a battery monitoring application to capture the battery usage information. The performance monitoring application further calls an application launch time monitoring application to capture the launch time of each of the one or more applications 204. The performance monitoring application also facilitates in calculating the User Interface (UI) rendering time for a particular screen. The AppMonitor 208 comprises one or more network usage application to provide details related to various network connections with the one or more applications 204. Further, the one or more network usage applications are called whenever a request is sent or received from the server 114 (FIG. 1).

In various embodiments of the present invention, the information collected by the AppMonitor 208 related to the portable communication device 104 (FIG. 1) is sent to the device monitoring module 110 (FIG. 1) and information related to the one or more applications 204 is sent to the application monitoring module 112 (FIG. 1) via central web service 106 (FIG. 1).

The AppHealth module 210 is configured to identify problems and suggest remedial measures thereby monitoring, managing and ensuring overall health of the one or more applications 204. Further, the AppHealth module 210 traces problems and performs diagnosis, debugging and backing up local data in case of crashing of the one or more applications 204. In an embodiment of the present invention, AppHealth module 210 traces problems in the one or more applications 204 using the application logs captured by the AppGuard 206. Further, the application logs comprise description of one or more unhandled exceptions. Furthermore, the description contains class name and location of the one or more unhandled exceptions used by the AppHealth module 210 to trace the problems. In an embodiment of the present invention, the AppHealth module 210 uses information related to application crashing to debug the one or more applications 204.

In an embodiment of the present invention, the AppHealth module 210 provides diagnostic information to the one or more administrators including, but not limited to, application creators and developers. The diagnostic information includes, but not limited to, information such as event logs, unhandled exceptions and sequence of events that lead to a crash. Further, the diagnostic information facilitates the one or more administrators to rectify the cause of the crash and restore the application 204. In another embodiment of the present invention, the AppHealth module 210 provides a disaster recovery mechanism by storing on-the-device data in case an application crashes. Further, the disaster recovery mechanism facilitates in restoring the state of the application to the state prior to the crash using the stored data.

Figure 3:
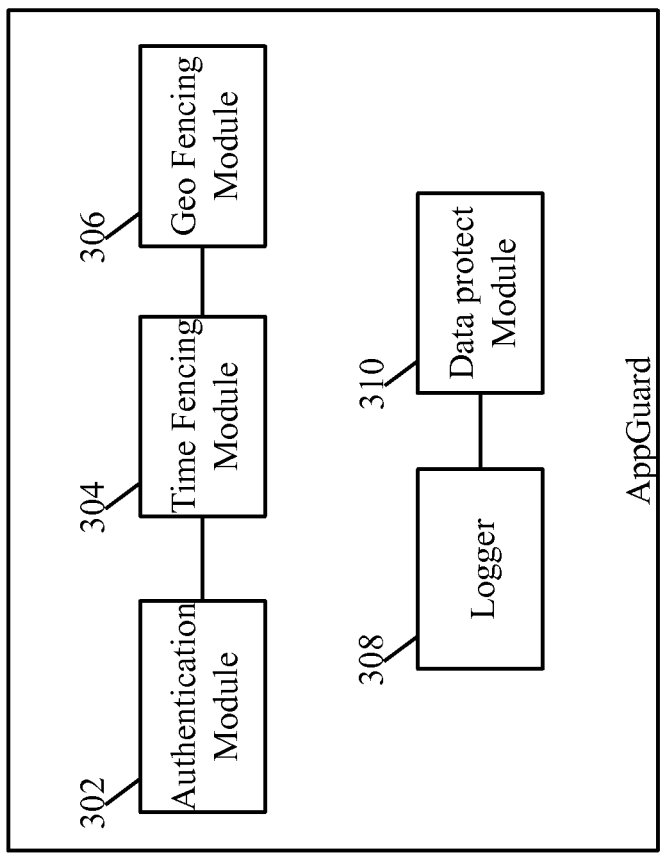
FIG. 3 is a detailed block diagram illustrating an App-Guard, in accordance with an embodiment of the present invention.

FIG. 3 is a detailed block diagram illustrating an AppGuard, in accordance with an embodiment of the present invention. The AppGuard 300 comprises an authentication module 302, a time fencing module 304, a geo fencing module 306, a logger 308, a data protect module 310 and a secure clip board module 312.

The authentication module 302 is configured to facilitate the one or more users to access the appbox 102 (FIG. 1) via one or more portable communication devices 104 (FIG. 1). In operation, the authentication module 302 renders options on the user interface 202 (FIG. 2) to facilitate the one or more users to provide authentication details. Further, the authentication module 302 receives the authentication details and ascertains if the authentication details provided are correct. If the authentication details provided are correct, then the control is transferred to the time fencing module 304. In an embodiment of the present invention, if the authentication details provided are incorrect then the authentication module 302 renders appropriate response message such as, but not limited to, "Authentication failed. Try again." on the user console 202 (FIG. 2). The authentication module 302 also keeps a check on the number of wrong attempts to access the appbox 102 (FIG. 1). Further, the authentication module 302 facilitates locking the appbox 102 (FIG. 1) in case the user exceeds the number of wrong attempts to access the appbox 102 (FIG. 1). In an embodiment of the present invention, if the authentication details are correct, then the control is transferred to the time fencing module 304.

The time fencing module 304 is configured to ensure that the one or more users access the appbox 102 (FIG. 1) within a permissible time frame as configured for the profile associated with the appbox 102 (FIG. 1). In an embodiment of the present invention, the time fencing module 304 does not allow the one or more users to access the appbox 102 (FIG. 1) even if the authentication details provided are correct, in case the one or more users are not accessing within the permitted time frame of access. The time fencing module 304 is further configured to monitor the application usage time and idle time and facilitate logging out in case the one or more users have not used the appbox 102 (FIG. 1) for a specific period of time.

The geo fencing module 306 is configured to ensure that the one or more users access the appbox 102 (FIG. 1) within a permissible geographic limit. The permissible geographic limit is associated with the profile of the user and is preconfigured by the one or more administrators based on the profile associated with the appbox 102 (FIG. 1). In an embodiment of the present invention, the user is unable to access the appbox 102 (FIG. 1) if the user is not within the permissible geographic limit although the authentication details provided may be correct. In an embodiment of the present invention, the geo fencing module 306 renders appropriate message on the user interface 202 (FIG. 2) if the user is not within the permissible geographic limit of access.

The logger 308 is configured to capture and store runtime events information and the audit log pertaining to the appbox 102 (FIG. 1) in the local appbox database (not shown) of the portable communication device 104 (FIG. 1). In an embodiment of the present invention, the logger 308 captures and stores the audit log pertaining to each of the one or more applications separately. In an embodiment of the present invention, the logger 308 is further configured to periodically send the captured information and the application logs to the server 114 (FIG. 1). In an embodiment of the present invention, the one or more administrators access the runtime events information and the application logs via the application monitoring module 112 (FIG. 1) and the device monitoring module 110 (FIG. 1) stored on the server 114 (FIG. 1). Further, each of the one or more applications on the appboxes 200 (FIG. 2) are identified by application identifiers and each of the one or more portable communication devices 104 (FIG. 1) are identified by device identifiers. The application identifiers and the device identifiers are used by the one or more administrators to access the runtime events information and the application logs. Furthermore, the information is sorted using time stamps and may be queried based on the date, time, application identifier and device identifier by the one or more administrators.

The data protect module 310 is configured to protect the data corresponding to the applications on the appbox 102 (FIG. 1) by encrypting the data. In an embodiment of the present invention, the data protect module 310 facilitates in securing the data thereby protecting from unauthorized access. The data protect module is also configured to allow or prevent access to one or more documents associated with the one or more applications 204 (FIG. 2) on the appbox 200 (FIG. 2). Further, the data protect module 310 is configured to allow or prevent the one or more users to share the one or more documents via one or more communication channels such as, but not limited to, electronic mail. In an embodiment of the present invention, the data protect module 310 is configured to prevent sensitive data being captured as a screenshot. In an embodiment of the present invention, the data protect module 310 is configured to prevent unauthorized access of databases associated with the one or more applications 204 (FIG. 2). Further, the data protect module 310 prevents unauthorized access of the databases by using one or more data-at-rest encryption methods.

In an embodiment of the present invention, the data protect module 310 is further configured to prevent file download beyond permissible file download limit. Further, the permissible file download limit is configured for each of the one or more profiles by the one or more administrators via the admin module 108 (FIG. 1). In an embodiment of the present invention, the data protect module 310 facilitates in protecting network and network connections by securely managing one or more sessions, creating secure service calls, and validating certificates. In an embodiment of the present invention, the data protect module 310 is configured to prevent copying and pasting of objects of the one or more applications 204 (FIG. 2) on the appbox 200 (FIG. 2), if the one or more applications 204 (FIG. 2) contain critical and confidential data.

Figure 4A:
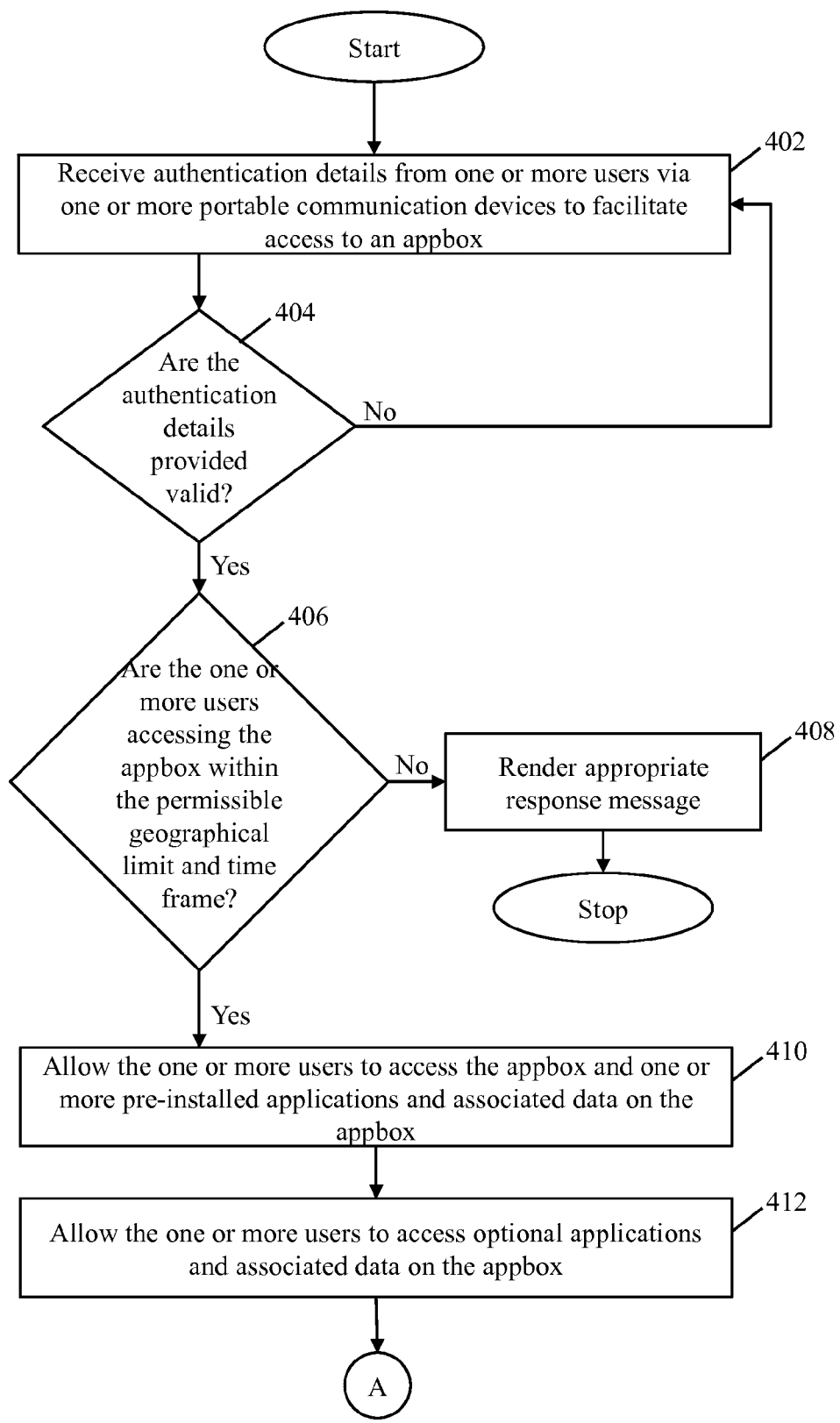
FIGS. 4A and 4B represent a flowchart illustrating a method for securely managing enterprise related applications and associated data on one or more portable communication devices, in accordance with an embodiment of the present invention.
Figure 4B:
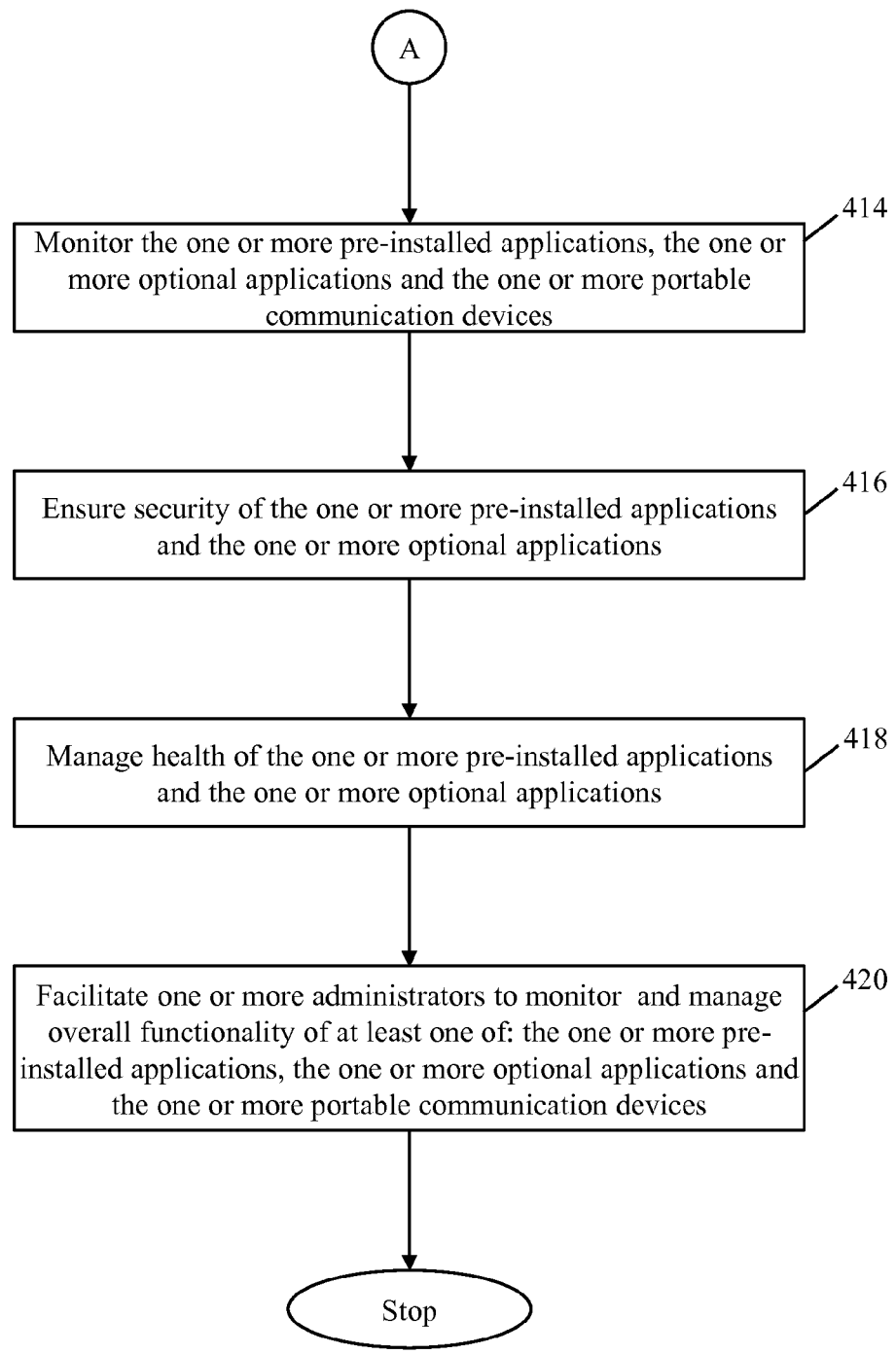

FIGS. 4A and 4B represent a flowchart illustrating a method for securely managing enterprise related applications and associated data on one or more portable communication devices, in accordance with an embodiment of the present invention.

At step 402, authentication details from one or more users via one or more portable communication devices are received to facilitate access to an appbox. In an embodiment of the present invention, the authentication details are provided by one or more administrators to the one or more users at the time of configuring the appbox on the one or more portable communication devices. In an embodiment of the present invention, the one or more portable communication devices include, but not limited to, a notebook, a laptop, a mobile phone, a smart phone and a Personal Digital Assistant (PDA).

In an embodiment of the present invention, the appbox is a software application designed to securely host the one or more applications and run on the one or more portable communication devices. In an embodiment of the present invention, the appbox can be downloaded and installed on any portable communication device independent of the operating system of the portable communication device. Further, the appbox contains the one or more applications required by the one or more users. In an embodiment of the present invention, the one or more applications run directly on operating systems of the one or more portable communication devices. In an embodiment of the present invention, the one or more applications include, but not limited to, one or more pre-installed applications and one or more optional applications (hereinafter also referred together as the one or more applications). Furthermore, each appbox is associated with a profile stored in a repository. In an embodiment of the present invention, the profile of the user is created by the one or more administrators based on the user's identity and role in the organization. Each of one or more profiles have its corresponding pre-installed applications, optional applications, limitations associated with data download, data protection and file sharing, accessibility options, security checks and protection measures. In an embodiment of the present invention, the one or more administrators, via an admin module, associate the one or more applications to the one or more profiles. Further, the one or more applications associated with a particular profile are then automatically installed on the appbox, when the appbox is configured on the one or more portable communication devices of the user having particular profile.

In an embodiment of the present invention, the one or more administrators remotely install new applications to the one or more appboxes based on the profiles of the one or more users. In an embodiment of the present invention, the one or more administrators configure new policies of the organization to control and manage the one or more appboxes and the one or more applications. The new policies may result in modifying the configuration of the existing profiles stored in the repository by adding new applications, deleting applications, modifying accessibility rights, modifying download limit and any other modifications based on the new policies.

At step 404, a check is performed to ascertain if the authentication details provided by the one or more users are correct. If it is ascertained that the authentication details provided are incorrect, then the control returns to step 402. If it is ascertained that the authentication details are correct, then at step 406, a check is performed to ascertain if the one or more users are accessing the appbox within the permissible geographical limit and time frame. If it is ascertained that the one or more users are accessing the appbox beyond at least one of: the permissible geographical limit and the time frame, then at step 408, appropriate response message is rendered on the one or more portable communication devices. In an exemplary embodiment of the present invention, the response message may be such as, but not limited to, "Access is Denied."

If it is ascertained that the one or more users are accessing the appbox within the permissible geographical limit and time frame, then at 410, the one or more users are allowed to access the appbox and the one or more pre-installed applications and associated data on the appbox. The one or more pre-installed applications are mandatory applications that are downloaded and installed on the appbox by an administrator at the time of configuring the appbox on the one or more portable communication devices.

In an embodiment of the present invention, the one or more pre-installed applications include mandatory applications associated to the user's profile such as, but not limited to, electronic mailing application, time-sheet application, billing application and any other applications that the user must access to work for the organization.

At step 412, the one or more users are allowed to download and access the one or more optional applications on the appbox. In an embodiment of the present invention, the one or more optional applications include, but not limited, charity application, social application, messenger, birthday application and any other application that the user has an option to download and install on the appbox. The one or more pre-installed applications and the one or more optional applications are also referred together as the one or more applications.

At step 414, the one or more applications and associated data and the one or more portable communication devices are monitored using a performance monitoring application. The performance monitoring application facilitates in collecting information related to the one or more applications on the appbox and the one or more portable communication devices when the one or more users access the appbox. In an embodiment of the present invention, the performance monitoring application collects and provide details such as, but not limited to, application name, application id and application version. In an embodiment of the present invention, the information related to the one or more applications include, but not limited to, application usage, application responsiveness, battery usage, user engagement and any other information related to application and device monitoring. In an embodiment of the present invention, the user engagement information includes, but not limited, feature usage of an application, duration of usage of an application, most used application, usage timings and peak usage hours. The user engagement information facilitates in identifying popular applications and popular features of the applications, setting Key Performance Indicators (KPIs), measuring KPIs and modifying KPIs.

In an embodiment of the present invention, the performance monitoring application calls an application monitoring application to provide information related to the one or more applications on a real time basis to an application monitoring module residing in a server. In another embodiment of the present invention, the performance monitoring application calls a device monitoring application to provide information related to the portable communication device on a real time basis to a device monitoring module residing in the server. Further, the information related to the portable communication device includes, but not limited, device identifier, device type, operating system version, device connectivity and device location.

At step 416, security of the one or more applications and associated data is ensured. In an embodiment of the present invention, the security of the one or more applications and associated data is ensured by using mechanisms to reduce run-time vulnerability of the one or more applications. Further, various tasks such as, but not limited to, collecting application logs, preventing exploitation, detecting vulnerability attacks, deploying one or more counter measures to improve response time and reducing impact of the vulnerability attacks on the one or more applications are performed to ensure security of the one or more applications and the one or more portable communication devices. In an embodiment of the present invention, the one or more counter measures are implemented if the one or more applications are vulnerable and prone to threats and attacks. Further, the one or more counter measures include, but not limited to, activating flags that facilitate network security, database protection and data protection. In an embodiment of the present invention, regular updates related to, but not limited to, security of the one or more applications and the one or more portable communication devices are sent to the device monitoring module and the application monitoring module.

At step 418, health of the one or more applications is managed and ensured by tracing problems, diagnosis, debugging and backing up local data in case of crashing. In an embodiment of the present invention, problems are traced in the one or more applications using the application logs. Further, the application logs comprise description of one or more unhandled exceptions. Furthermore, the description contains class name and location of the one or more unhandled exceptions which are used to trace the problems in the one or more applications. In an embodiment of the present invention, information related to application crashing is used to debug the one or more applications.

At step 420, the one or more administrators are facilitated to monitor and manage overall functionality of at least: the one or more applications and associated data and the one or more portable communication devices via the device monitoring module and the application monitoring module using the information received from the one or more appboxes. In an embodiment of the present invention, the device monitoring module facilitates the one or more administrators to monitor and manage device usage once the one or more users access the appbox, user engagement with the appbox, number of users accessing one or more appboxes, application logs, exceptions and crashes that require deploying the one or more counter measures and view any other relevant information related to the one or more portable communication devices. In an embodiment of the present invention, the application monitoring module provides an interface to the one or more administrators to monitor the applications usage and user engagement with the various applications, upgrade the one or more applications, deploy the one or more counter measures in case of crashes and security threats to the one or more applications and view any other information related to the one or more applications received from the one or more appboxes.

Figure 5:
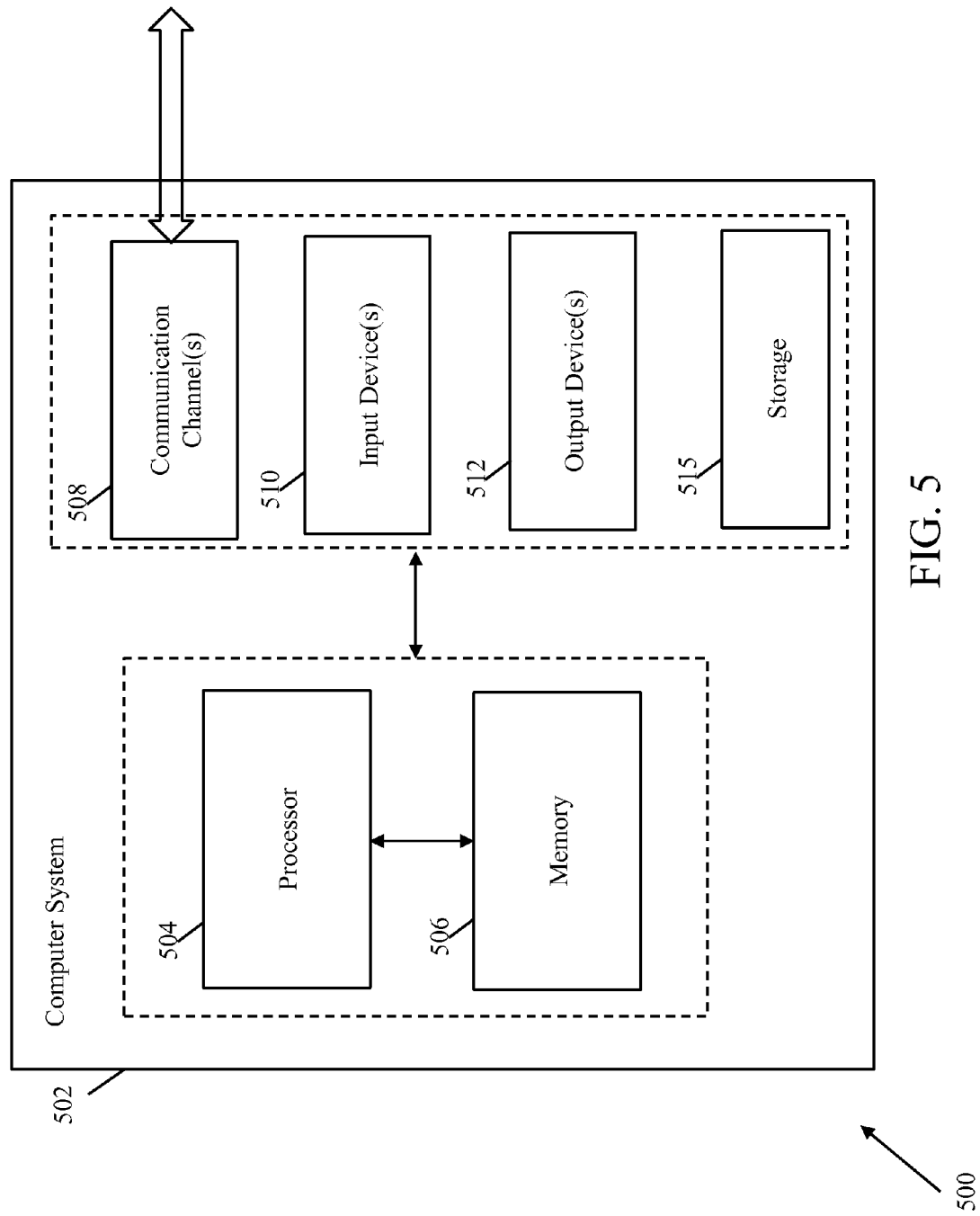
FIG. 5 illustrates an exemplary computer system in which various embodiments of the present invention may be implemented.

FIG. 5 illustrates an exemplary computer system in which various embodiments of the present invention may be implemented.

The computer system 502 comprises a processor 504 and a memory 506. The processor 504 executes program instructions and may be a real processor. The processor 504 may also be a virtual processor. The computer system 502 is not intended to suggest any limitation as to scope of use or functionality of described embodiments. For example, the computer system 502 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 506 may store software for implementing various embodiments of the present invention. The computer system 502 may have additional components. For example, the computer system 502 includes one or more communication channels 508, one or more input devices 510, one or more output devices 512, and storage 514. An interconnection mechanism (not shown) such as a bus, controller, or network, interconnects the components of the computer system 502. In various embodiments of the present invention, operating system software (not shown) provides an operating environment for various softwares executing in the computer system 502, and manages different functionalities of the components of the computer system 502.

The communication channel(s) 508 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 510 may include, but not limited to, a keyboard, mouse, pen, joystick, trackball, a voice device, a scanning device, or any another device that is capable of providing input to the computer system 502. In an embodiment of the present invention, the input device(s) 510 may be a sound card or similar device that accepts audio input in analog or digital form. The output device(s) 512 may include, but not limited to, a user interface on CRT or LCD, printer, speaker, CD/DVD writer, or any other device that provides output from the computer system 502.

The storage 514 may include, but not limited to, magnetic disks, magnetic tapes, CD-ROMs, CD-RWs, DVDs, flash drives or any other medium which can be used to store information and can be accessed by the computer system 502. In various embodiments of the present invention, the storage 514 contains program instructions for implementing the described embodiments.

The present invention may suitably be embodied as a computer program product for use with the computer system 502. The method described herein is typically implemented as a computer program product, comprising a set of program instructions which is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel(s) 508. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

I claim:

1. A system for securely managing enterprise related applications and associated data on one or more portable communication devices related to an enterprise, the system comprising:

one or more appboxes, the one or more appboxes residing on the one or more portable communication devices and host one or more applications, the one or more applications are accessed by one or more employees of the enterprise using the one or more appboxes, the one or more applications are associated with the one or more employees based on roles of the one or more employees in the enterprise, the one or more applications while being hosted on the one or more appboxes run on operating system of the one or more portable communication devices, the one or more appboxes are configured to secure, monitor and collect information related to: the one or more applications hosted on the one or more appboxes and associated data, and the one or more portable communication devices; and a server configured to facilitate one or more administrators to install, monitor and manage overall functionality of: the one or more appboxes, the one or more applications hosted on the one or more appboxes and associated data, and the one or more portable communication devices using the collected information, wherein each of the one or more appboxes is installed based on identity and role of the employee in the enterprise, further wherein the installation of the one or more appboxes results in automatic installation of the one or more applications on the one or more appboxes.

2. The system of claim 1, wherein the one or more appboxes comprise an AppGuard configured to secure the one or more applications and associated data and further configured to: receive authentication details from the one or more employees via the one or more portable communication devices; perform a check to ascertain if the received authentication details are valid; perform a check to ascertain if the one or more employees are accessing the one or more appboxes within permissible geographical limit and time frame; and allow the one or more employees to access the one or more appboxes and the one or more applications and associated data if it is ascertained that the received authentication details are valid and the one or more employees are accessing the one or more appboxes within permissible geographical limit and time frame.

3. The system of claim 1, wherein securing the one or more applications and associated data comprises at least one of: encrypting the data associated with the one or more applications, preventing sharing of documents via one or more communication channels, preventing capturing of data as a screenshot, preventing unauthorized access to databases, preventing file download, maintaining file download limit, managing one or more network connections, preventing copying and pasting of objects, creating secure service calls, capturing and storing runtime events information, auditing logs, detecting threats and attacks on the one or more applications and facilitating deploying one or more counter measures.

4. The system of claim 1, wherein the one or more portable communication devices are monitored and information related to the one or portable communication devices is collected when the one or more appboxes are accessed by one or more employees.

5. The system of claim 1, wherein monitoring and managing the overall functionality of at least one of:

the one or more applications and associated data and the one or more portable communication devices by the one or more administrators comprise: monitoring applications usage, employee engagement, response time, transactions and resource usage, upgrading the one or more applications, deploying counter measures, locking and unlocking the one or more appboxes, deleting the one or more applications, deleting the data associated with the one or more applications, checking statuses of the one or more portable communication devices, accessing application logs and viewing any other information related to the one or more applications and the one or more portable communication devices.

6. The system of claim 1, wherein the server further comprises an admin module configured to facilitate the one or more administrators to: configure the one or more appboxes on the one or more portable communication devices; install the one or more applications on the one or more configured appboxes; and control and manage the configured one or more appboxes and the one or more installed applications; wherein configuring the one or more appboxes and installing the one or more applications is based on profiles of the one or more employees.

7. The system of claim 1, wherein the one or more applications include at least one of: one or more applications installed by the one or more administrators and one or more optional applications which are downloaded by the one or more employees.

8. The system of claim 1, wherein the one or more appboxes are designed to securely host the one or more applications and associated data.

9. The system of claim 1, wherein the one or more portable communication devices include at least one of: a notebook, a laptop, a mobile phone, a smart phone and a Personal Digital Assistant (PDA).

10. The system of claim 1, wherein the one or more appboxes comprise an AppHealth module configured to manage health of the one or more applications by tracing one or more problems and providing one or more remedial measures and further wherein tracing problems and providing one or more remedial measures comprise performing at least one of: diagnosis, debugging and backing up local data in case of crashing of the one or more applications.

11. The system of claim 1, wherein the collected information related to the one or more applications and associated data include at least one of: application usage, application responsiveness, battery usage and employee engagement with the one or more applications.

12. The system of claim 1, wherein the collected information related to the one or more portable communication devices include at least one of: device identifier, device type, operating system version, device connectivity and device location.

13. A computer-implemented method for securely managing enterprise related applications and associated data on one or more portable communication devices related to an enterprise, via program instructions stored in a memory and executed by a processor, the computer-implemented method comprising:
 allowing one or more employees to access one or more appboxes, and one or more applications and associated data, wherein the one or more appboxes reside on the one or more portable communication devices, the one or more applications are accessed by one or more employees of the enterprise using the one or more appboxes, the one or more applications are associated with the one or more employees based on roles of the one or more employees in the enterprise, the one or more applications while being hosted on the one or more appboxes run on operating system of the one or more portable communication devices;
 securing, monitoring and collecting, by the one or more appboxes, information related to: the one or more applications hosted on the one or more appboxes and associated data, and the one or more portable communication devices;
 sending, from the one or more appboxes, the collected information to a server on a real time basis; and
 facilitating, at the server, the one or more administrators to install, manage and monitor overall functionality of: the one or more appboxes, the one or more applications and associated data, and the one or more portable communication devices using the information received by the server, wherein each of the one or more appboxes is installed based on identity and role of the employee in the enterprise, further wherein the installation of the one or more appboxes results in automatic installation of the one or more applications on the one or more appboxes.

14. The computer-implemented method of claim 13, wherein the step of allowing the one or more employees to access the one or more Appboxes and the one or more applications comprise: receiving authentication details from the one or more employees via the one or more portable communication devices; performing a check to ascertain if the received authentication details are valid; performing a check to ascertain if the one or more employees are accessing the one or more appboxes within permissible geographical limit and time frame; and allowing the one or more employees to access the one or more appboxes and the one or more applications if it is ascertained that the received authentication details are valid and the one or more employees are accessing the one or more appboxes within permissible geographical limit and time frame.

15. The computer-implemented method of claim 13, wherein the step of securing the one or more applications and associated data comprises at least one of: encrypting the data associated with the one or more applications, preventing sharing of documents via one or more communication channels, preventing capturing of data as a screenshot, preventing unauthorized access to databases, preventing file download, maintaining file download limit, managing one or more network connections, preventing copying and pasting of objects, creating secure service calls, capturing and storing runtime events information, auditing logs, detecting threats and attacks on the one or more applications and facilitating deploying one or more counter measures.

16. The computer-implemented method of claim 13, wherein the one or more portable communication devices are monitored and information related to the one or portable communication devices is collected when the one or more appboxes are accessed by one or more employees.

17. The computer-implemented method of claim 13 further comprise facilitating the one or more administrators to: configure the one or more appboxes on the one or more portable communication devices; install the one or more applications on the one or more appboxes; and control and manage the one or more configured appboxes and the one or more installed applications; wherein the step of configuring the one or more appboxes and installing the one or more applications is based on profiles of the one or more employees.

18. The computer-implemented method of claim 13, wherein the one or more applications include at least one of: one or more applications installed by the one or more administrators and one or more optional applications which are downloaded by the one or more employees.

19. The computer-implemented method of claim 13, wherein the one or more appboxes are designed to securely host the one or more applications.

20. The computer-implemented method of claim 13, wherein the one or more portable communication devices include at least one of: a notebook, a laptop, a mobile phone, a smart phone and a Personal Digital Assistant (PDA).

21. The computer-implemented method of claim 13 further comprising the step of managing the health of the one or more applications, wherein managing the health of the one or more applications comprise tracing one or more problems and providing one or more remedial measures and further wherein tracing the one or more problems and providing the one or more remedial measures comprise performing at least one of: diagnosis, debugging and backing up local data in case of crashing of the one or more applications.

22. The computer-implemented method of claim 13, wherein the collected information related to the one or more applications and associated data include at least one of: application usage, application responsiveness, battery usage and employee engagement with the one or more applications.

23. The computer-implemented method of claim 13, wherein the collected information related to the one or more portable communication devices include at least one of: device identifier, device type, operating system version, device connectivity and device location.

24. A computer program product for securely managing enterprise related applications and associated data on one or more portable communication devices related to an enterprise, the computer program product comprising: a non-transitory computer-readable medium having computer-readable program code stored thereon, the computer-readable program code comprising instructions that when executed by a processor, cause the processor to:
 allow one or more employees to access one or more appboxes and one or more applications and associated data, wherein the one or more appboxes reside on the one or more portable communication devices, the one or more applications are accessed by one or more employees of the enterprise using the one or more appboxes, the one or more applications are associated with the one or more employees based on roles of the one or more employees in the enterprise, the one or more applications while being hosted on the one or more appboxes run on operating system of the one or more portable communication devices;
 secure, monitor and collect, by the one or more appboxes, information related to: the one or more applications hosted on the one or more appboxes and associated data, and the one or more portable communication devices;
 send, from the one or more appboxes, the collected information to a server on a real time basis; and
 facilitate, at the server, the one or more administrators to install, manage and monitor overall functionality of: the one or more appboxes, the one or more applications hosted on the one or more appboxes and associated data, and the one or more portable communication devices using the information received by the server, wherein each of the one or more appboxes is installed based on identity and role of the employee in the enterprise, further wherein the installation of the one or more appboxes results in automatic installation of the one or more applications on the one or more appboxes.

25. The computer program product of claim 24, wherein allowing the one or more employees to access the one or more Appboxes and the one or more applications comprise: receiving authentication details from the one or more employees via the one or more portable communication devices; performing a check to ascertain if the received authentication details are valid; performing a check to ascertain if the one or more employees are accessing the one or more appboxes within permissible geographical limit and time frame; and allowing the one or more employees to access the one or more appboxes and the one or more applications if it is ascertained that the received authentication details are valid and the one or more employees are accessing the one or more appboxes within permissible geographical limit and time frame.

26. The computer program product of claim 24, wherein securing the one or more applications and associated data comprises at least one of: encrypting the data associated with the one or more applications, preventing sharing of documents via one or more communication channels, preventing capturing of data as a screenshot, preventing unauthorized access to databases, preventing file download, maintaining file download limit, managing one or more network connections, preventing copying and pasting of objects, creating secure service calls, capturing and storing runtime events information, auditing logs, detecting threats and attacks on the one or more applications and facilitating deploying one or more counter measures.

27. The computer program product of claim 24, wherein the one or more portable communication devices are monitored and information related to the one or portable communication devices is collected when the one or more appboxes are accessed by one or more employees.

28. The computer program product of claim 24 further comprises facilitating the one or more administrators to: configure the one or more appboxes on the one or more portable communication devices; install the one or more applications on the one or more appboxes; and control and manage the one or more configured appboxes and the one or more installed applications; wherein the step of configuring the one or more appboxes and installing the one or more applications is based on profiles of the one or more employees.

29. The computer program product of claim 24, wherein the one or more applications include at least one of: one or more applications installed by the one or more administrators and one or more optional applications which are downloaded by the one or more employees.

30. The computer program product of claim 24, wherein the one or more appboxes are designed to securely host the one or more applications.

31. The computer program product of claim 24 further comprising managing the health of the one or more applications, wherein managing the health of the one or more applications comprise tracing one or more problems and providing one or more remedial measures and further wherein tracing the one or more problems and providing the one or more remedial measures comprise performing at least one of: diagnosis, debugging and backing up local data in case of crashing of the one or more applications.

32. The computer program product of claim 24, wherein the collected information related to the one or more applications and associated data include at least one of: application usage, application responsiveness, battery usage and employee engagement with the one or more applications.

33. The computer program product of claim 24, wherein the collected information related to the one or more portable communication devices include at least one of: device identifier, device type, operating system version, device connectivity and device location.

* * * * *